(12) United States Patent
Kiesbauer

(10) Patent No.: US 9,952,604 B2
(45) Date of Patent: Apr. 24, 2018

(54) FIELD DEVICE FOR CONTROLLING A PROCESS FLUID FLOW

(71) Applicant: Samson Aktiengesellschaft, Frankfurt am Main (DE)

(72) Inventor: Joerg Kiesbauer, Eppertshausen (DE)

(73) Assignee: SAMSON AKTLENGESELLSCHAFT, Frankfurt am Main (DE)

( * ) Notice: Subject to any disclaimer, the term of this patent is extended or adjusted under 35 U.S.C. 154(b) by 40 days.

(21) Appl. No.: 15/148,171

(22) Filed: May 6, 2016

(65) Prior Publication Data
US 2016/0327964 A1   Nov. 10, 2016

(30) Foreign Application Priority Data
May 7, 2015  (DE) .................. 10 2015 005 832

(51) Int. Cl.
   G05D 7/06      (2006.01)
   F16K 31/126    (2006.01)

(52) U.S. Cl.
   CPC ....... *G05D 7/0682* (2013.01); *F16K 31/1262* (2013.01); *F16K 31/1266* (2013.01); *G05D 7/0688* (2013.01)

(58) Field of Classification Search
   CPC ................ G05D 7/0688; G05D 7/0682; F16K 31/1262; F16K 31/1266
   USPC ....... 137/554, 553, 488, 489.5, 489
   See application file for complete search history.

(56) References Cited

U.S. PATENT DOCUMENTS

| | | | | |
|---|---|---|---|---|
| 2,309,848 A | * | 2/1943 | King | G05D 16/163 137/484.2 |
| 5,967,176 A | * | 10/1999 | Blann et al. | F16K 31/365 137/488 |
| 6,035,878 A | * | 3/2000 | Adams et al. | G05D 16/2093 137/1 |
| 6,382,226 B1 | * | 5/2002 | Larson et al. | F16K 37/0091 137/1 |
| 7,621,170 B2 | * | 11/2009 | Hoffmann et al. | G01M 3/2876 73/1.72 |

(Continued)

FOREIGN PATENT DOCUMENTS

| DE | 19540441 A1 | 4/1997 |
|---|---|---|
| DE | 29806665 U1 | 10/1998 |

(Continued)

*Primary Examiner* — Kevin Lee
(74) *Attorney, Agent, or Firm* — Schiff Hardin LLP

(57) ABSTRACT

A field device that includes a primary valve, a main actuator, a bypass line, a secondary valve, and a position controller. The primary valve can be configured to adjust a process fluid flow. The main actuator can be configured to control the primary valve. The main actuator includes a working chamber to be subjected with a process fluid and a return device configured to bias the valve member. The bypass line can be configured to fluidly connect an inlet and an outlet of the primary valve to feed the process fluid to the working chamber. The position controller configured to control a pneumatic actuator to control the secondary valve to change a process fluid pressure in the working chamber. The controlling of the pneumatic actuator can include generating a pneumatic control signal based on a position of the primary valve and supplying the pneumatic control signal to the pneumatic actuator.

17 Claims, 3 Drawing Sheets

(56) References Cited

U.S. PATENT DOCUMENTS

| | | | |
|---|---|---|---|
| 7,779,852 B2 * | 8/2010 | Burlage et al. | F17D 5/06 137/1 |
| 8,381,761 B2 * | 2/2013 | Re | F16K 31/1268 137/489.5 |
| 8,430,123 B2 * | 4/2013 | Kleegrewe | G05B 9/02 137/554 |
| 8,521,334 B2 * | 8/2013 | Meier et al. | F15B 15/20 137/554 |
| 2012/0091376 A1 | 4/2012 | Kiesbauer et al. | |

FOREIGN PATENT DOCUMENTS

| | | |
|---|---|---|
| DE | 10320031 A1 | 12/2004 |
| DE | 102010037898 A1 | 4/2012 |
| DE | 102011056521 B4 | 8/2014 |
| GB | 850374 A | 10/1960 |

* cited by examiner

FIELD DEVICE FOR CONTROLLING A PROCESS FLUID FLOW

CROSS REFERENCE TO RELATED APPLICATIONS

This patent application claims priority to German Patent Application No. 102015005832.0, filed May 7, 2015, which is incorporated herein by reference in its entirety.

BACKGROUND

The disclosure relates to a field device for controlling a process fluid flow, including a large-volume process fluid stream in a processing plant, such as a refinery, a food processing plant (e.g., a brewery), a petrol chemical plant, or the like.

For leading and controlling of process fluid flows such as large-volume process fluid flows in a processing plant, valves having a large throughflow-cross section, in particular having a connection nominal diameter of at least DN 100, preferably at least DN 200, are employed. As understood by one of ordinary skill in the relevant arts, "DN" refers to the standard designation of pipe size diamètre nominal/nominal diameter (in millimeters).

Valves of this magnitude require large positioning-forces and a high drive- or actuator-power in order to achieve or hold a control position or in order to drive into a safety position. In order to provide the large positioning forces, pneumatic actuators can be employed which are controlled by a pneumatic position controller. Pneumatic actuators are connected to a constant pneumatic pressure source, which can be subjected with a pneumatic control signal via the pneumatic position controller by means of a set position control, in order to move the control valve for adjusting the process fluid stream. The pneumatic actuator has the advantage of an absent or low electric energy consumption so that an explosion hazard in the surrounding of the position controller is significantly reduced, however, the pneumatic circuitry causes relatively high assembly- and maintenance costs.

In order to reduce the energy required by the actuator for adjusting positioning a large valve, part of the process fluid stream can be diverted and can be used as actuator fluid for controlling the large valve. An arrangement of the previously described type, in which an actuator of a primary valve is fed by process fluid, is described in DE 10 2010 037 898 A1. In the known arrangement, a primary valve is provided including an inlet, an outlet and a valve passage arranged between inlet and outlet, which valve passage is closeable by a movable valve member of the primary valve. The valve member further comprises a passage into a balancing- or working-chamber, which enables a fluid communication between the inlet and the working chamber. The working chamber is connected to the outlet of the main or primary valve via a line. Also within the working chamber is arranged a spring that biases the valve member towards the valve passage. Between the working chamber and the outlet, a secondary or auxiliary adjustment device is arranged having a secondary or auxiliary valve and an electric actuator for adjusting the secondary valve. By closing the secondary valve, a pressure can be generated in the working chamber such that the fluid forces and the spring biasing force hold the main valve member in a closed position. When the auxiliary valve is opened, the process fluid can escape from the working chamber towards the outlet and the working chamber pressure sinks. As soon as the spring forces are overcome by the process fluid pressure in the inlet acting on the valve member, the main valve member moves out of the valve passage and opens the main valve.

The known field device is, however, disadvantageous in that, within the auxiliary adjustment device, the process fluid must be led in immediate proximity to the electric actuator power of the auxiliary actuator. Due to the high inflammability of certain process fluids, a relatively large constructive effort is required in order to meet the standards of explosion protection in such control devices. Furthermore, the known arrangement causes high costs during field device installation because the electric actuator energy must be led to the field device, possibly for several hundred meters, of cableway within the processing plant in an explosion-proof manner.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

Figure 1:
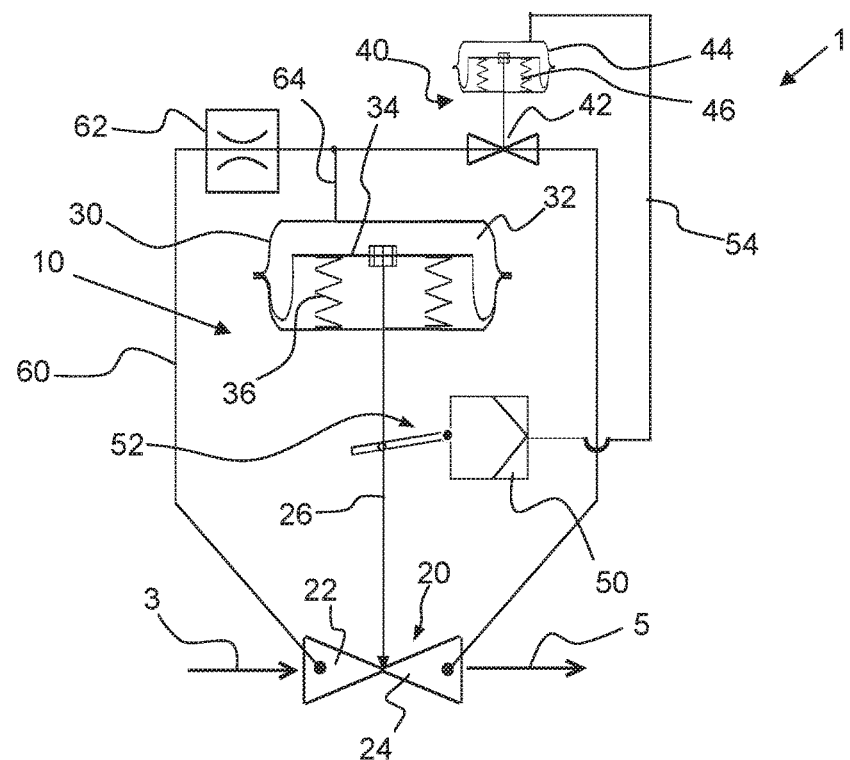
FIG. 1 is a schematic illustration of a field device according to an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an objective of the present disclosure to provide a field device of simple design that works energy-efficiently and meets provisions of explosion protection and reduces installation costs.

In an exemplary embodiment, a field device for controlling a process fluid stream of a processing plant comprises a main valve or primary valve for setting or adjusting the process fluid stream, which includes a valve passage closeable with a valve member, an inlet upstream of the valve passage and an outlet downstream of the valve passage, as well as a process-fluid-fed main actuator for positioning or controlling the primary valve, which includes at least one working chamber to be subjected with process fluid, and a return device, such as an return chamber, which return chamber in particular is to be subjected with the process fluid or another fluid, and/or a spring storage, in particular for biasing the valve member. In an exemplary embodiment, the working chamber is at least partially limited by a movable active actuator area, such as a membrane or a piston side, against which the process fluid acts, in order to create the main actuator force of the main actuator, or at least in order to directly influence the main actuator for example against a spring force of a biased pressure spring. In particular, the spring storage engages the movable active actuator area. The field device further comprises a bypass line for feeding process fluid to the working chamber. The bypass line fluidically connects the outlet and the inlet. In an exemplary embodiment, the primary valve has a valve housing which internally defines a valve passage and/or the valve seat, wherein in the housing part limiting the inlet or the outlet, respectively, an opening is placed into which the bypass line is connected or connectable for creating the fluid pressures between inlet and outlet. Furthermore, the field device has an auxiliary or secondary valve line arranged in the bypass for changing the process fluid pressure in the working chamber. Additionally, the secondary valve can be arranged in the bypassed line in such that the throughflow-cross section at the position of the secondary valve can be changed, particularly closed and/or fully opened. Thereby, the secondary valve is configured such that it can be adjusted between the closed position and the opened position continuously step-free.

In an exemplary embodiment of the present disclosure, the field device is provided with a pneumatic actuator or secondary actuator, which is structurally configured for operating the secondary valve, for in particular continuously adjusting or setting the process fluid pressure in the working chamber of the main actuator. The pneumatic actuator has a pneumatic pressure source which feeds the pneumatic actuator with pneumatic actuator energy. Furthermore, the field device according to the invention comprises a pneumatic position controller, which, dependent upon the position of the primary valve, creates a pneumatic positioning- or control-signal and supplies it to the pneumatic actuator. The pneumatic actuator or secondary actuator is constructively docked to the secondary actuator housing.

With the measure according to one or more exemplary embodiments, a significant improvement of the control process of the process fluid stream can be achieved, although the operative position of the primary valve is used as a control value for the control and/or positioning of the secondary valve on the pneumatically actuated secondary valve. By knowing the position of the primary valve, in particular based on information of further operating data, such as pressure or temperature, in particular of the process fluid stream, the position control of the secondary valve is performed.

The disclosure is also directed to a method for controlling a process fluid flow. In an exemplary embodiment, a method for controlling the process fluid stream of the processing plant is provided, in which a main- or primary-valve is adjusted by a process-fluid-fed main actuator, by subjecting the working chamber thereof with process fluid. An additional pneumatic actuator for positioning or controlling a secondary valve is provided, which adjusts the process fluid stream into the working chamber. The position of the secondary valve to be controlled via the pneumatic actuator is adjusted such that the pneumatic actuator is supplied with a pneumatic control signal or positioning signal, which is controlled dependent upon the position of the primary valve.

The field device according to one or more exemplary embodiments can be configured to perform the method steps of the method. The control method according to one or more exemplary embodiments can proceed according to the functional steps of the field device according to one or more exemplary embodiments.

In contrast to the known electric actuators of control devices, a large number of additional adjustment parameters can be provided with the device according to one or more exemplary embodiments of a pneumatic actuator or auxiliary actuator, via which the operating pressure within the working chamber of the main drive can be controlled step-free and precisely. In the common device systems, a flexible adjustment of the main actuator force is, if at all, only possible to a limited extent.

In an exemplary embodiment, by using a pneumatic actuator in the control device (e.g. controller), it is possible to omit an electrical actuator energy supply for the control device. This allows for a simplified and compact construction of the control device because neither isolation distances nor isolating or sealing constructive measures between the parts of the control device leading a process fluid and the actuator of the control device are required. A cost intensive running of electric lines during the installation of the control device is omitted. By feeding the main actuator with process fluid, the pneumatic energy requirement for setting the primary valve can be significantly reduced even for large volume process fluid streams. Thereby both installation costs, as well as maintenance costs are significantly reduced in the actuator according to the exemplary embodiments of the present disclosure.

The field device according to an exemplary embodiment includes two control devices, namely a primary- or main-control device and a secondary- or auxiliary-control device. In one or more exemplary embodiments, both control devices have correspondingly associated and/or differently operated actuators, wherein the actuator force for the main positioning (control) actuator is realized on the basis of pressure differences of the process fluid between inlet and outlet, wherein the secondary- or auxiliary-actuator receives a pneumatic actuator signal from a pneumatic position controller according to a control routine, via which the secondary- or auxiliary-valve shall be driven to its desired position. In an exemplary embodiment, the control routine for the secondary control device, in particular being implemented in the position controller thereof, utilizes a pneumatic operating cycle which is completely separate from the process fluid, wherein the position control is achieved with the aid of detecting the position of the primary valve, which position signal is supplied to the pneumatic position controller of the pneumatic position controller of the secondary control device.

In an exemplary embodiment, two positioning actuators, namely a main actuator and a secondary actuator, are provided, wherein the main actuator is being filled with process medium, while the secondary- or auxiliary-actuator is subjected to the pneumatic control signal of the position controller of the auxiliary control device.

In an exemplary embodiment, the bypass line connects the inlet to the process fluid sink, such as the outlet of the primary valve, and comprises a junction to the working chamber arranged between the inlet and the process fluid sink. The secondary valve can, dependent on the design of the main valve, in particular, dependent on the predetermined effect the spring storage, face towards the inlet or face towards the outlet in relation to the junction. In case the secondary valve is arranged on the outlet side, the fluid stream excess pressure at the inlet prevails within the working chamber of the primary valve (in particular in case of the secondary valve being closed). By opening the secondary valve, pressure equalization, in particular, dependent on the position of the secondary valve, is partially or fully achieved. In this way, the spring storages working against the working chamber can deliver their spring force, such that the primary valve can be brought into the desired forced position due to the return force of the return device.

In an exemplary embodiment, the secondary valve can be arranged on the side of the bypass line facing towards the inlet with respect to the junction. In the inlet-sided configuration of the arrangement of the secondary valve, the working chamber is always subjected with the pressure of the pressure sink at the outlet. When opening, in particular when continuously opening, the secondary valve, the working chamber can be particularly continuously subjected to excess pressure of the inlet, such that the return device, in particular spring forces of a spring storage, can be overcome, so that, through the pressure increase, the valve member of the primary valve can be moved to a desired adjustment position.

As illustrated, the stream gradient on the primary valve within the process fluid stream is utilized in order to generate actuating forces of the primary actuator.

In an exemplary embodiment of the present disclosure, a reduction member or throttle member, such as a fixed reduction, for limiting the process fluid pressure in the bypass line is arranged in the bypass line upstream of the junction and/or the secondary valve of the control device is arranged downstream of the junction. In an alternative embodiment, the reduction member is arranged downstream of the junction and the secondary valve, correspondingly, upstream of the junction.

In an exemplary embodiment, the reduction member can also be designed as an adjustable throttle, as a control valve connected to the position controller of the control device, or as a second control device independent of the control device which comprises the secondary valve. With the aid of the reduction member, the process fluid stream led through the bypass line can be limited, so that merely small control forces for influencing the throttled process fluid stream in the bypass line are required for a change of pressure in the working chamber of the primary actuator. Arranging the secondary valve upstream of the junction allows supplying the maximal inlet pressure to the working chamber of the main actuator in order to achieve a dynamic control movement, if required.

In an exemplary embodiment, the position controller comprises a position detector configured to determine the position of the primary valve. In particular, the position detector is configured to determine and/or measure the distance between a first reference position stationary relative to the valve passage of the primary valve and a second reference position. The determination and/or measurement can be contact-free. The first stationary reference position can be a sensor position within the position controller, which can, for example, be attached to a yoke of a primary valve or to a housing of the main actuator. In an alternative embodiment, the position detector can be received with a housing unit separate from the position controller which is stationarily attached to a yoke of the primary valve, to the main actuator, or to a valve body of the primary valve, and which is connected to the position controller in a signal conducting manner. The second reference position is defined on a positioning force transmitting member of the main valve or of the main actuator, such as an actuator- and/or valve-rod, a membrane plate, or a piston of the main actuator.

In an exemplary embodiment, for contact-free measurement, the first or second reference position can be provided with a magnetic field inducing indicator and the respective other reference position with a Hall-sensor-element, which detects a change of distance with respect to the indicator through a change of the registered magnetic field. Alternatively or additionally to the Hall-sensor, the position detector can comprise a mechanism, which mechanically transfers the path which one reference position of the positioning force transmitting member covers to a position sensor. Thereby, a proportional path transmission can be realized through the mechanism. In particular, the mechanism couples the positioning force transmission member to a position sensor particularly being arranged within the position controller, such as a potentiometer. Since the position detector directly takes the position of the primary valve and provides it to the position controller, the position controller generates the pneumatic control signal independent of possibly changing operating conditions in the bypass line, so that a high quality of control is achieved, and so that reliable information with respect to the primary valve position is transferred to a process monitoring system.

In an exemplary embodiment, the primary valve comprises a particularly fluid tight housing, which forms an inlet opening and an outlet opening, as well as the valve passage in which the valve member is control-moveable (or, adjustment-moveable). In this example, the main actuator can be completely received within the housing. Alternatively or additionally, the position detector can be completely received within the housing. In particular, the housing comprises exactly one electric interface for transferring position detection data to the position controller. By integrating the main actuator and/or the position detector into the main valve housing, a particularly compact design is achieved. Since an integrated main actuator is not subjected to environmentally influences, this embodiment is essentially maintenance-free.

In an exemplary embodiment, the position controller is designed such that the secondary valve can selectively, for changing the position of the primary valve, act as an open/close-valve, which is moved exclusively between a fully opened and a fully closed valve position, or as a control valve, which can take any arbitrary intermediate position between a fully opened and a fully closed position. In an exemplary embodiment, the auxiliary valve is arranged in the bypass line such that the working chamber can be subjected to the maximal process fluid pressure present at the inlet of the primary valve. By controlling the secondary valve as an open/close-valve, a very quick control response of the primary valve can be achieved. By controlling like a control valve, process fluid streams can be adjusted precisely at the primary valve. In particular, the position controller can select the type of control dependent on the primary valve control signal, a predetermination-signal from the process monitoring system, a detected temperature signal or a detected process fluid pressure signal and/or from diagnostic information, which the position controller calculates from one or more of the afore-mentioned signals.

In an exemplary embodiment, the position controller includes an electric connection, such as a current loop connection or a field bus connection, via which it receives an electric desired position signal for the primary valve.

In an exemplary embodiment, the position controller comprises a wireless communication module (e.g. a wireless transceiver), such as a Bluetooth module. The wireless communication module receives and/or sends positioning-set-values, positioning information and/or diagnostic information from or to a process monitoring system. The position controller calculates from the positioning-set-value, in particular taking into consideration the controlled system from the pneumatic drive via the primary valve to the valve member of the primary valve, a pneumatic control signal and provides this via a pneumatic output to the pneumatic drive or pneumatic actuator. In an exemplary embodiment, the position controller includes processor circuitry configured to perform one or more functions of the position controller, including calculating the pneumatic control signal.

In an exemplary embodiment, the position controller is connected in a signal transmitting manner to a pressure sensor for detecting the process fluid pressure in the inlet and/or to a pressure sensor for detecting the process fluid pressure in the outlet of the primary valve and/or to a temperature for detecting the temperature of the process fluid. In particular, the position controller calculates the pneumatic control signal and/or the diagnostic information dependent up on at least one of the selection comprising process fluid pressure in the inlet, process fluid pressure in the outlet, and the process fluid temperature.

In an exemplary embodiment, the field device comprises an electricity generator or power generator, such as a turbine, an electromagnetic pneumatic pressure converter or a thermocouple, for creating or producing electric energy from the process fluid stream energy. In particular, the electric power generator is interposed in the bypass line. In an exemplary embodiment, the electric power generator supplies the position controller, the position detecting device, the pressure sensors, and/or the temperature sensor with electric energy.

In an exemplary embodiment, the secondary valve, the bypass line or the reduction member are integrated into a common housing. In particular, from a valve body of the secondary valve, the bypass line and the reduction member are formed from one monolithic housing block. In the housing block, there are additionally arranged the moveable valve member of the secondary valve and a mechanism for transmitting the positioning- or control-force of the pneumatic actuator. In an exemplary embodiment, the housing is configured as an assembly unit firmly connected to the main actuator and/or to the primary valve, preferably free of dynamic seals. It shall be clear, that the assembly unit is transportable as a whole and must merely be connected for an initial installation at the operation site with external connections, namely the inlet connection, the outlet connection, the pneumatic actuator of the secondary valve, and the position detector of the position controller.

In an exemplary embodiment, the position controller comprises a controller housing configured for forming an assembly unit at least with the pneumatic actuator. Therefore, on the outside of the controller housing, a connection structure is formed for locally defined attachment of the controller to the pneumatic actuator and for emitting a pneumatic control signal. In particular, the pneumatic actuator includes a reception structure which is mirror-inverted, in particular complementarily formed, with respect to the connection structure of the controller housing. In an exemplary embodiment, the position controller comprises, besides the connection structure, one pneumatic interface for connection to a pneumatic pressure source, and one electric interface for connecting to a process monitoring system. In an exemplary embodiment, the position controller includes exactly one pneumatic interface and exactly one electric interface.

In an exemplary embodiment, the field device can be forming as a complete assembly unit, in which the primary valve, the housing, the secondary valve, the bypass line, and the reduction member are integrated, as well as an assembly unit consisting of position controller and pneumatic actuator which are connected to one another ready for installation, such that the respective interfaces are stationarily defined relative to one another. In an alternate embodiment, the position controller is arranged separately, for example on a yoke of the primary valve.

One or more exemplary embodiments of the disclosure have the advantage that seals on the connection transitions between the position controller and the positioning actuator as well as between the secondary valve, the bypass line, the main actuator and the primary valve can be configured in a simple constructive manner, without having to consider dynamic loads. Furthermore, the field device according to the invention allows for a time- and cost-saving assembly, because merely one connection to external supply-connections has to be established. Large electric currents or voltages are avoided in the proximity of the process fluid by utilizing the pneumatic actuator, so that a sufficiently high explosion protection of the field device can be ensured even in case of leaks at the field device.

In FIG. 1, the field device 1 according to an exemplary embodiment is shown. In an exemplary embodiment, the field device 1 comprises a main or primary valve 20 which is utilized in a process fluid conduit system of a processing plant which is not illustrated in further detail. The primary valve 20 controls a process fluid stream indicated with the arrows 3, 5 and comprises an inlet 22 upstream of a valve passage through the primary valve 20, which the passage is not illustrated in detail in FIG. 1, and an outlet 24 lying downstream of the valve passage. A valve member (not shown in detail in FIG. 1) is adjustment-moveably or control-moveably mounted in a valve-body or -housing of the primary valve 20, in order to influence the process fluid stream from the inlet to the outlet by changing the free valve passage cross section. The valve member is connected in a positioning-movement-transmitting-manner (or adjustment-movement-transmitting-manner) to a primary actuator or a main actuator 30 via a valve- and/or actuator-rod 26. In an exemplary embodiment, the main actuator 30 comprises a working chamber 32 as well as a return chamber 36, which are separated from one another through a membrane plate 34. The actuator- and/or valve-rod 26 are connected in a positioning force conducting manner to the membrane plate 34.

Via a bypass line 60 which connects the inlet 22 of the main valve 20 to the outlet 24, which acts as a process fluid pressure sink, by bridging the valve passage of the primary valve 20, process fluid is fed into the working chamber 32 of the main actuator 30. The maximal influx-pressure towards the working chamber is limited by a fixed reduction 62, which is arranged in the bypass line 60 between the inlet 22 and a junction 64 to the working chamber 32. The fixed reduction 62 together with the secondary valve 42 serves as a partial pressure distributor, so that, for a fully-opened secondary valve, the pressure in the chamber 32 can escape completely.

In an exemplary embodiment, downstream of the junction 64, a controller 40 (as referred to as a control device) is arranged in the bypass line 60. The controller 40 can include a secondary valve 42, with which the pressure present in the working chamber 32 of the main control actuator 30 is adjustable. The controller 40 can be referred to as secondary controller 40 or auxiliary controller 40. In an exemplary embodiment, the secondary/auxiliary controller 40 includes a single-pneumatic actuator 44 which opens or closes the secondary valve 42 in accordance with a supplied pneumatic control signal. The controller 40 can be realized as a lift valve having a pneumatic membrane actuator. For increasing of pressure in the working chamber 32, the throughflow-cross section of the secondary valve 42 is decreased, so that dammed process fluid streams into the working chamber 32. In case the secondary valve 42 is opened, the spring force of the return spring 36 in the main actuator 30 causes the process fluid to flow out of the working chamber 32 to the outlet 24. In an exemplary embodiment, the controller 40 includes processor circuitry configured to perform one or more functions of the controller 40, including the operation of the actuator 44 and/or valve 42.

In an exemplary embodiment, the controller 40 comprises a position controller 50 connected to a pneumatic actuator 44 of the controller 40 via a pneumatic line 54. Dependent upon the position of the main valve 20 and on the positioning-target or -setpoint, the position controller 50 creates a control signal (e.g., pneumatic control signal) for the pneumatic actuator 44. In an exemplary embodiment, the position controller 50 includes processor circuitry configured to perform one or more functions of the position controller 50, including calculating one or more control signals (e.g. pneumatic control signal).

In an exemplary embodiment, at the position controller 50, a position detector 52 for determining the position of the valve 20 is provided. The position detector 52 directly (or indirectly) engages the valve- and/or actuator-rod 26 of the main valve 20 via a measurement mechanism, in order to measure the path covered by the valve- and/or actuator-rod 26. Therefore, the position detector 52 defines a first stationary reference point, relative to which a second reference point stationary on the valve- and/or actuator-rod 26 moves. The length of movement is for example taken by a potentiometer or other sensor devices as would be understood by those skilled in the art and provided to the position controller 50 as a positioning signal.

In an exemplary embodiment, the position controller 50 is configured to receive, from a process monitoring system, an electric desired position signal for the main valve 20. In an exemplary embodiment, the position controller 50 is connected to a pneumatic supply which is not illustrated in detail. In an exemplary embodiment, a control routine implemented in the position controller 50 calculates a pneumatic control signal based on the measured position and from the measured desired position signal of the primary valve 20. The pneumatic control signal is then supplied to the pneumatic actuator 44 of the position controller 40. In an exemplary embodiment, the pneumatic control signal is calculated by the position controller 50 so that the auxiliary or secondary valve 42 takes a position which increases or decreases the process fluid pressure in the working chamber 32 such that the positioning movement according to the control occurs at the primary valve 20.

In an exemplary embodiment, the positioning device 40 can also be configured such that the pneumatic actuator 44 and the auxiliary control valve 42 are realized as a pneumatically actuating open/close-valve. Through a correspondingly configured control routine in the position controller 50, fast control dynamics of the primary valve can be achieved. The position controller 50 can also be configured such that it selectively controls the controller 40 selectively in a valve controlled operation condition or in an open/close-valve-operation-condition. Switching between the controlled valve operation condition and open/close-valve-operation-condition can depend on the primary valve's position, a target value of the monitoring system or one or more parameters regarding valve, process fluid or plant which are collected by the position controller.

In an exemplary embodiment not shown in detail, in spite of a fixed reduction 62, an electric or pneumatic control- or open/close-valve can be provided. The electric or pneumatic control- or open/close-valve can be controlled by the position controller 50.

In an exemplary embodiment not shown in detail, the field device comprises a power converter, which produces electrical energy from the process fluid energy. The power converter supplies the position controller 50, the position detector 52 and possibly an electrically adjustable throttle member.

In an exemplary embodiment, the field device 1 according to FIG. 1 is configured such that, in case of power failure, an open safety position is obtained. If a pneumatic control signal for the actuator 44, which is normally to be generated by the position controller 50, remains absent, the return spring action is configured such that the secondary valve 42 will be completely opened through spring energy. If the secondary valve 42 is completely open, the bypass line 60 does not have a (sufficient) flow resistance downstream of the junction towards the working chamber 32, which resistance could cause pressure build-up in the working chamber 32. The return spring 36 of the main actuator 30 is configured as such that it exceeds the feeding pressure into the working chamber, that is limited through the reduction member 62, and brings the primary valve 20 into an open position.

Figure 2:
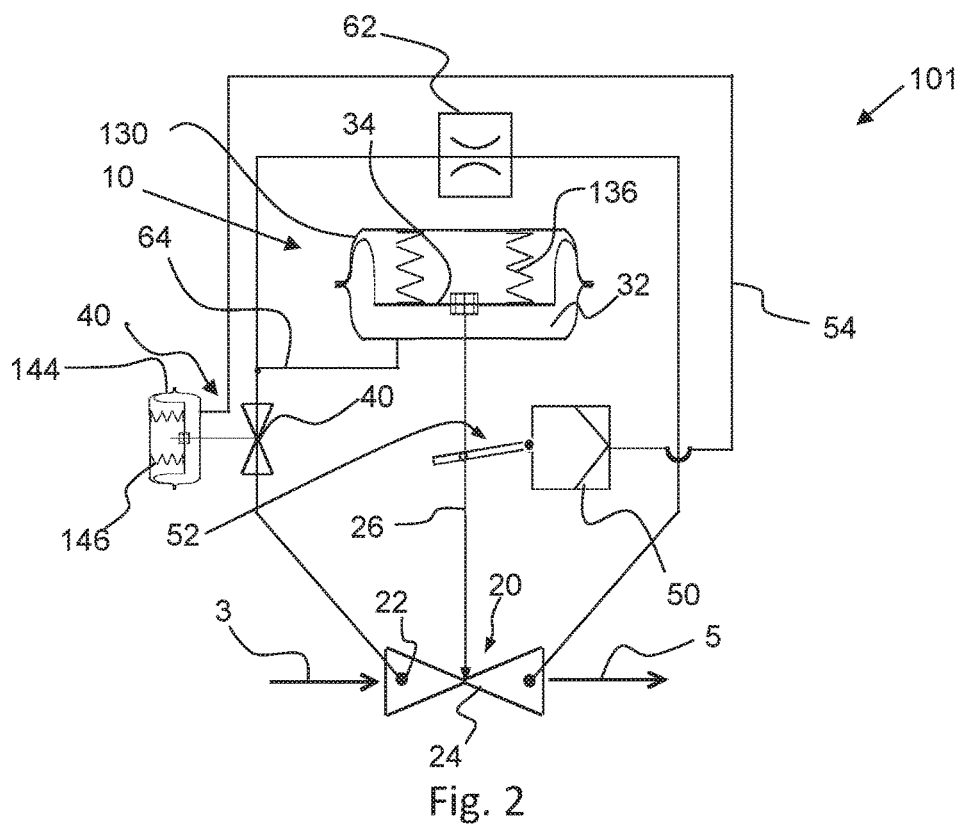
FIG. 2 is a schematic illustration of a field device according to an exemplary embodiment of the present disclosure.

FIG. 2 shows a field device 101 according to an exemplary embodiment of the present disclosure. The field device 101 includes aspects that correspond to the embodiments of the field device 1 of FIG. 1, and the same reference numerals are used for the same components. Different/changed components have a reference numeral increased by 100.

In an exemplary embodiment, the field device 101 differs from the field device 1 in that the positioning device 40 is arranged upstream of the junction 64 to the working chamber, and in that the reduction member 62 is arranged downstream of the junction 64. Furthermore, the return springs 146 of the pneumatic actuator 144 and the return springs 136 of the primary actuator 130 are arranged in the respective actuator such that the secondary valve 42 and the primary valve 20 obtain a closed safety position, as soon as the operating power fails. In case the pneumatic actuator 144 receives no pneumatic control signal from the positioning controller 50, the return spring 146 urges the auxiliary valve 42 into a closed position. Thereby, any process fluid feed to the working chamber 32 of the main actuator 130 is interrupted and the return spring 136 of the main actuator 130 urges remaining process fluid out of the working chamber 32 into the outlet 24. Through the return movement, the valve 20 is moved into a closed safety position.

Figure 3:
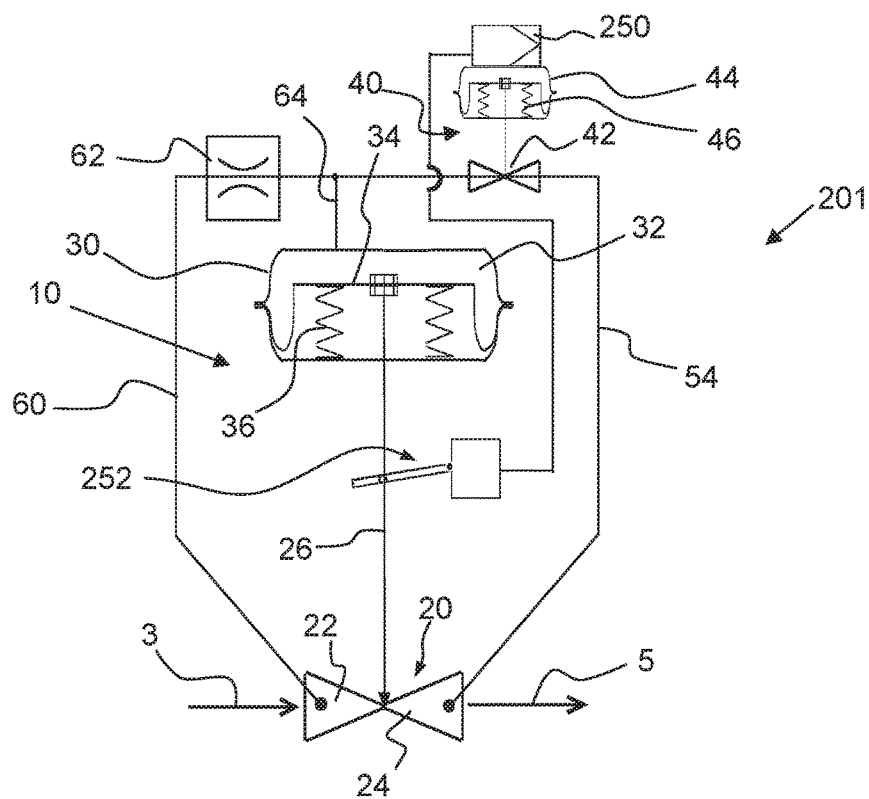
FIG. 3 is a schematic illustration of a field device according to an exemplary embodiment of the present disclosure.

A field device 210 according to an exemplary embodiment is shown in FIG. 3. The field device 210 includes aspects that correspond to the embodiments of the field device 1 of FIG. 1, and the same reference numerals are used for the same components. Different/changed components have a reference numeral increased by 200.

In an exemplary embodiment, the field device 201 differs from the field device 1 in that the position controller 250 is configured as an assembly unit together with the pneumatic actuator 44 of the controller 40. Therefore, the position controller 250 is arranged within a controller housing, which is stationarily attached, immediately adjacent to the housing of the pneumatic actuator 44. In an exemplary embodiment, the actuator housing contacts the housing of the position controller. The controller housing comprises on an outside, which is not shown in detail, a stationary pneumatic output interface, which can be brought into sealing engagement with a stationary pneumatic input interface of the pneumatic actuator 44. A dynamic seal on moveable connection components is omitted, so that a simple and low-cost construction is possible. The assembly unit can furthermore include the auxiliary valve 42 which is pre-assembled to the pneumatic actuator 44 for instance via a yoke. The position sensor 252 is realized as an external position sensor in the field device 201, which sensor is connected to the position controller 250 in a signal conducting manner.

Figure 4:
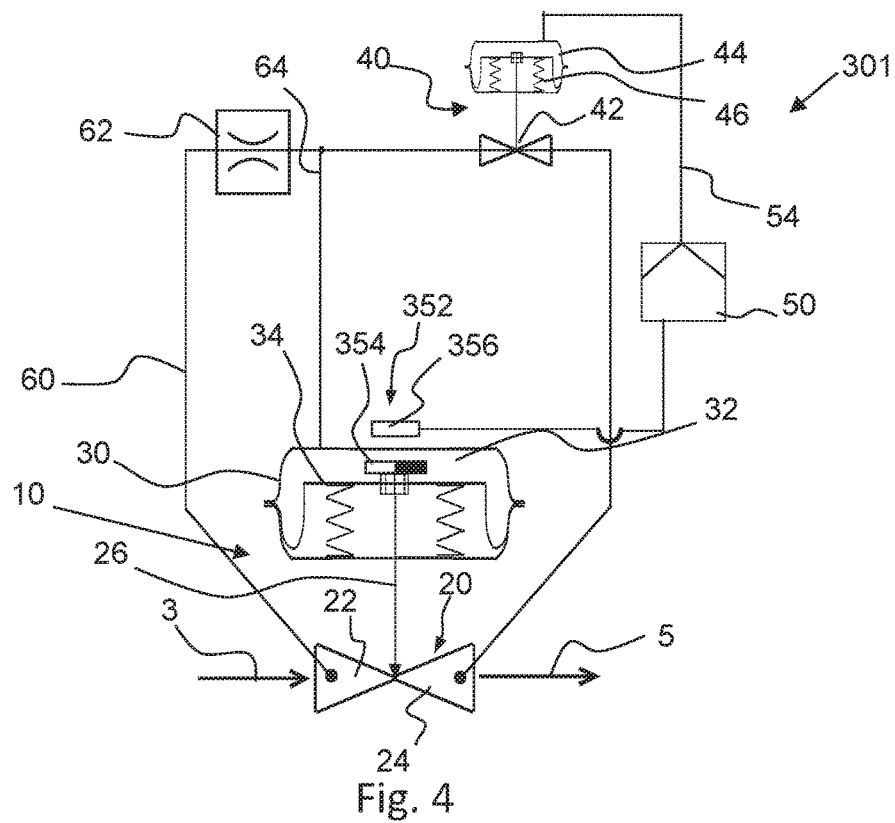
FIG. 4 is a schematic illustration of a field device according to an exemplary embodiment of the present disclosure.

A field device 301 according to an exemplary embodiment is shown in FIG. 4. The field device 210 includes aspects that correspond to the embodiments of the field device 1 of FIG. 1, and the same reference numerals are used for the same components. Different/changed components have a reference numeral increased by 300.

In an exemplary embodiment, the field device 301 differs from field device 1 essentially in that the position detector 350 detects the valve position of the primary valve 20 in a contract-free manner. Therefore, a pneumatic position encoder 253 is stationarily arranged on the connection point between actuator- and/valve-rod 26 and the membrane plate 34. The magnetic position indicator or encoder 354 moves path-identically with the actuator- and/or valve-rod 26. In an area that can be influenced through the magnetic field of the position encoder 354 adjacent to the main actuator 30, a Hall sensor 356 is arranged with detects a change of the magnetic field created by the position encoder 354 due to a change of the distance between Hall-sensor 356 and position encoder 354. The Hall-sensor 356 is connected to the position controller 50 in a signal conducting manner. In an embodiment which is not shown in further detail, the position detector 352 is completely integrated or encased within the housing of the main actuator and accessible from the outside exclusively via an electrical signal interface.

Figure 5:
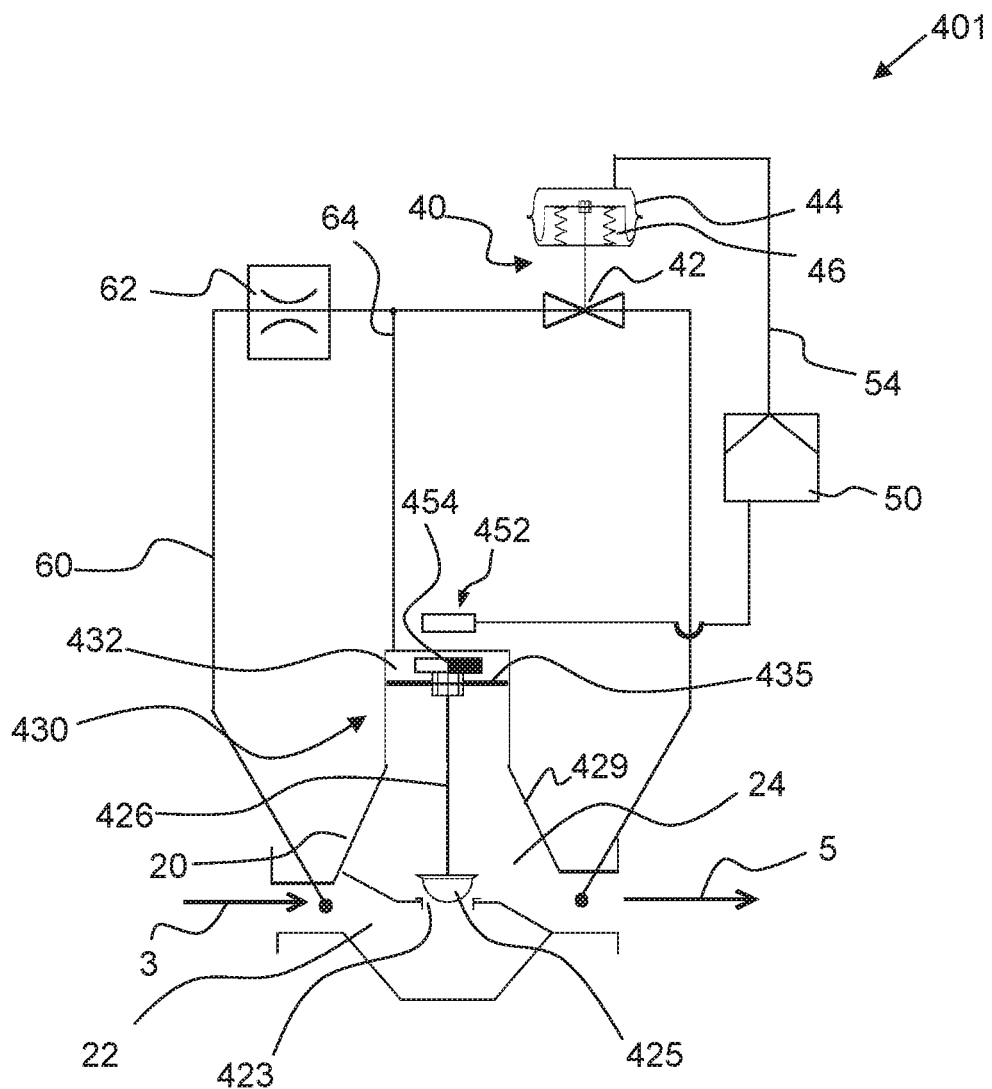
FIG. 5 is a schematic illustration of a field device according to an exemplary embodiment of the present disclosure.

A field device 401 according to an exemplary embodiment is shown in FIG. 5. The field device 210 includes aspects that correspond to the embodiments of the field device 1 of FIG. 1, and the same reference numerals are used for the same components. Different/changed components have a reference numeral increased by 400.

In an exemplary embodiment, the field device 401 differs from the field device 1 through the main actuator 430, the working chamber 432 of which is arranged within a housing 429 of the primary valve 20. In case the pneumatic actuator 44 of the auxiliary controller 40 receives a pneumatic signal to open the secondary valve 42 from the position control 50, no sufficiently high counter pressure is build up in the working chamber 432 in order to avoid that the process fluid pressure in the inlet lifts the valve member 425 to open the valve passage 423. In case the pneumatic actuator 44 receives a pneumatic control signal to close the secondary valve 42, a counter pressure for closing the primary valve 20 can be created in the working chamber. The reduction member 62 and the active area 435 of the main actuator 430 are, with respect to the valve passage and to the valve member of the primary valve 20, configured such that the closing occurs without return spring. The position detector 452 is configured according to the position detecting device 352 of the field device 301 shown in FIG. 4.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1, 101, 201, 301, 401 field device
3 arrow
5 arrow
20 primary valve
22 inlet
24 outlet
26 actuator- and/or valve-rod
30, 130, 430 main actuator
32, 432 working chamber
34 membrane plate
36 return chamber
40 controller
42 secondary valve
44, 144 pneumatic actuator
46, 146 return spring
50, 250 position controller
52, 352, 452 position detector
60 bypass line
62 reduction member
64 junction
354 position encoder
356 Hall-sensor
423 valve passage
425 valve member
429 housing
435 active area

What is claimed is:

1. A field device operable to control a process fluid stream of a processing plant, the field device comprising:
a primary valve configured to adjust a process fluid flow, the primary valve including:
an inlet upstream of a valve passage being closeable by a valve member, and
an outlet downstream of the valve passage;
a main actuator configured to control the primary valve, the main actuator being fed with process fluid of the process fluid flow, the main actuator including:
at least one working chamber to be subjected with the process fluid, and
a return device configured to bias the valve member;
a bypass line configured to fluidly connect the inlet and the outlet to feed the process fluid to the working chamber;
a secondary valve configured to change a process fluid pressure in the working chamber; and
a position controller configured to control a pneumatic actuator to control the secondary valve, the position controller including a position sensor configured to determine the position of the primary valve, and a mechanism configured to couple a positioning-force-transmitting-member of the main actuator or of the primary valve to the position sensor, wherein the controlling of the pneumatic actuator includes: generating a pneumatic control signal based on a position of the primary valve, and supplying the pneumatic control signal to the pneumatic actuator to control the secondary valve.

2. The field device according to claim 1, wherein the bypass line comprises:
a junction connected to the working chamber, the junction being arranged between the inlet and the outlet; and
a restriction member arranged in the bypass line upstream or downstream of the junction, the restriction member being configured to limit a pressure of the process fluid, wherein the secondary valve is arranged correspondingly downstream or upstream of the junction.

3. The field device according to claim 1, wherein the position controller comprises:
a position detector configured to determine the position of the primary valve, the determining of the position of the primary valve including determining a distance between a first reference position stationary relative to the valve passage of the primary valve and a second reference position defined on a positioning-force-transmitting-member of the main actuator or of the primary valve.

4. The field device according to claim 1, wherein the position sensor includes a potentiometer.

5. The field device according to claim 1, wherein the primary valve comprises: a fluid tight housing that forms an inlet connection, an outlet connection, and the valve passage, wherein the valve member is adjustment-moveably mounted.

6. The field device according to claim 5, wherein at least one of the main actuator and a position detector is enclosed completely within the housing.

7. The field device according to claim 5, wherein the housing includes exactly one electrical interface for transmission of position detection states to the position controller.

8. The field device according to claim 1, wherein the position controller is configured to selectively control the secondary valve as an open/close-valve or as a control-valve for a position change of the main valve, wherein the secondary valve is arranged in the bypass line such that the process fluid pressure within the working chamber is the same process fluid pressure as present in the inlet of the primary valve.

9. The field device according to claim 1, wherein the position controller comprises an electric connection via which the position controller receives an electrical positioning signal for the primary valve.

10. The field device according to claim 1, wherein the position controller comprises a wireless communication module configured to send to and/or receive from a process monitoring system at least one of: position values, position-information and diagnosis information.

11. The field device according to claim 1, wherein:
the position controller is connected to at least one of:
a pressure sensor configured to detect a process fluid pressure in the inlet,
a pressure sensor configured to detect a process fluid pressure in the outlet of the primary valve, and
a temperature sensor configured to detect a temperature of the process fluid; and
the position controller is configured to calculate diagnostic information based on at least one of: the process fluid pressure in the inlet, the process fluid pressure in the outlet, and the temperature of the process fluid.

12. The field device according to claim 1, further comprising an electrical generator configured to produce electrical energy from process fluid stream energy, wherein the electrical generator supplies the position controller with the electrical energy.

13. The field device according to claim 1, wherein at least one of the secondary valve, the pneumatic actuator, the bypass line and a reduction member are integrated in a common housing, and wherein at least one of:
- at least one of a valve body of the secondary valve, the bypass line and the reduction member are made from one monolithic housing block, and
- the housing is configured with at least one of the main actuator and the primary valve as a connected assembly unit void of dynamic seals.

14. The field device according to claim 1, wherein:
- the position controller includes a controller housing configured to create an assembly unit with at least the pneumatic actuator, the controller housing forming a connection structure configured to stationarily fasten to the pneumatic actuator and transmit a pneumatic control signal, and
- at least one of: the pneumatic actuator includes a mirror-inverted configured connection structure, and the position controller includes exactly one pneumatic interface configured to connect to a pressure source and exactly one electrical interface configured to connect to a process monitoring system.

15. The field device according to claim 1, wherein the return device includes at least one of a return chamber and a spring storage.

16. A field device operable to control a process fluid stream of a processing plant, the field device comprising:
- a primary valve configured to adjust a process fluid flow, the primary valve including:
  - an inlet upstream of a valve passage being closeable by a valve member, and
  - an outlet downstream of the valve passage;
- a main actuator configured to control the primary valve, the main actuator being fed with process fluid of the process fluid flow, the main actuator including:
  - at least one working chamber to be subjected with the process fluid, and
  - a return device configured to bias the valve member;
- a bypass line configured to fluidly connect the inlet and the outlet to feed the process fluid to the working chamber;
- a secondary valve configured to change a process fluid pressure in the working chamber; and
- a position controller configured to control a pneumatic actuator to control the secondary valve, the controlling of the pneumatic actuator including generating a pneumatic control signal based on a position of the primary valve, and supplying the pneumatic control signal to the pneumatic actuator to control the secondary valve,
wherein at least one of the secondary valve, the pneumatic actuator, the bypass line and a reduction member are integrated in a common housing; and
wherein at least one of:
- at least one of a valve body of the secondary valve, the bypass line and the reduction member are made from one monolithic housing block, and
- the housing is configured with at least one of the main actuator and the primary valve as a connected assembly unit void of dynamic seals.

17. A field device operable to control a process fluid stream of a processing plant, the field device comprising:
- a primary valve configured to adjust a process fluid flow, the primary valve including:
  - an inlet upstream of a valve passage being closeable by a valve member, and
  - an outlet downstream of the valve passage;
- a main actuator configured to control the primary valve, the main actuator being fed with process fluid of the process fluid flow, the main actuator including:
  - at least one working chamber to be subjected with the process fluid, and
  - a return device configured to bias the valve member;
- a bypass line configured to fluidly connect the inlet and the outlet to feed the process fluid to the working chamber;
- a secondary valve configured to change a process fluid pressure in the working chamber; and
- a position controller configured to control a pneumatic actuator to control the secondary valve, and including a controller housing configured to create an assembly with at least the pneumatic actuator, the controller housing forming a connection structure configured to stationarily fasten to the pneumatic actuator and transmit a pneumatic control signal, wherein:
- the controlling of the pneumatic actuator includes: generating a pneumatic control signal based on a position of the primary valve, and supplying the pneumatic control signal to the pneumatic actuator to control the secondary valve; and
- at least one of: the pneumatic actuator includes a mirror-inverted configured connection structure, and the position controller includes exactly one pneumatic interface configured to connect to a pressure source and exactly one electrical interface configured to connect to a process monitoring system.

* * * * *